United States Patent [19]

Hurst

[11] 4,069,500
[45] Jan. 17, 1978

[54] ARRANGEMENTS FOR TESTING COLOR TELEVISION SYSTEMS

[75] Inventor: Robert Norman Hurst, Cherry Hill, N.J.

[73] Assignee: RCA Corporation, New York, N.Y.

[21] Appl. No.: 737,004

[22] Filed: Oct. 29, 1976

[51] Int. Cl.² .............................................. H04N 9/62
[52] U.S. Cl. ...................................................... 358/10
[58] Field of Search ...................................... 358/10, 13

[56] References Cited

FOREIGN PATENT DOCUMENTS 963,137  1964  United Kingdom ................... 358/10

Primary Examiner—John C. Martin
Attorney, Agent, or Firm—Eugene M. Whitacre; Mason DeCamillis

[57] ABSTRACT

A repetitive cyclic test signal representing constant chrominance with changing phase, changing chrominance with constant phase, and changing chrominance with changing luminance is coupled through a television system under test to a vectorscope display device for measuring saturation, hue and luminance crosstalk within the television system.

2 Claims, 3 Drawing Figures

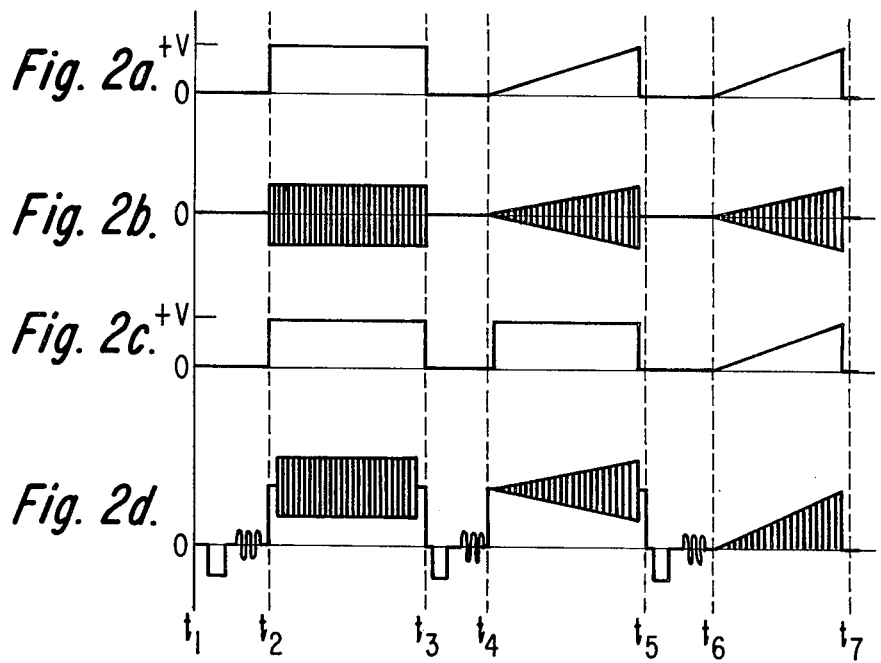
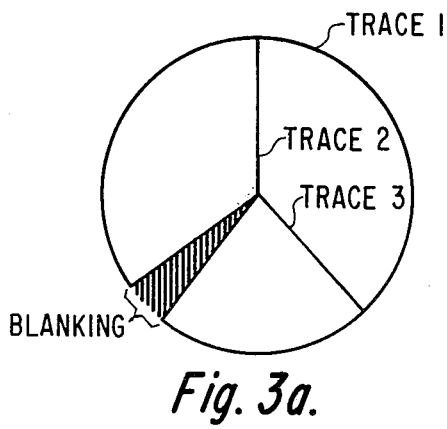
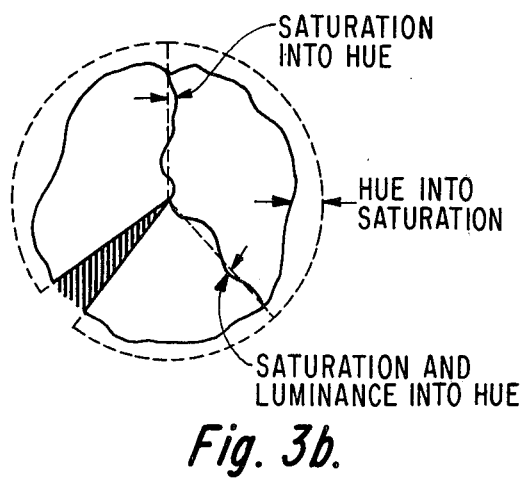

ARRANGEMENTS FOR TESTING COLOR TELEVISION SYSTEMS

BACKGROUND OF THE INVENTION

This invention relates to a method and apparatus for measuring saturation, hue and luminance crosstalk in color television systems.

In the digital processing of television signals, e.g., in a pulse code modulated television system, inaccuracies in the digitizing process tend to cause saturation of the color output signal to depend on the hue. Similarly, the hue may become a function of saturation, and the luminance may crosstalk into both hue and saturation. Although the effects of crosstalk between hue, saturation and luminance are discernable in the picture image, the contribution of each element to the crosstalk is not readily measurable from the final picture image.

SUMMARY OF THE INVENTION

Apparatus and a method are provided for testing color television systems in conjunction with a vectorscope display device for measuring saturation, hue and luminance crosstalk; the method comprising the steps of generating a repetitive cyclic test signal corresponding to first, second and third television lines having synchronizing and active line portions for developing first, second and third information traces on the display device; the first television line active line portion having a constant chrominance amplitude with changing phase for representing variations in hue on the first information trace, the second television line active line portion having a changing chrominance amplitude with constant phase for representing variations in saturation on the second information trace, and the third television line active line portion having a changing chrominance amplitude with constant phase and increasing luminance amplitude for representing variations in saturation with luminance on the third information trace; applying the repetitive test signal to the television equipment under test and measuring crosstalk in the form of hue into saturation, saturation into hue, saturation and luminance into hue as a function of the distortion of the first, second and third information traces.

BRIEF DESCRIPTION OF THE DRAWINGS

FIGS. 2a – 2d illustrate waveforms depicting the operation of the system of FIG. 1; and FIGS. 3a & 3b illustrate typical test method results as viewed on the display device.

DESCRIPTION OF THE INVENTION

Figure 1:
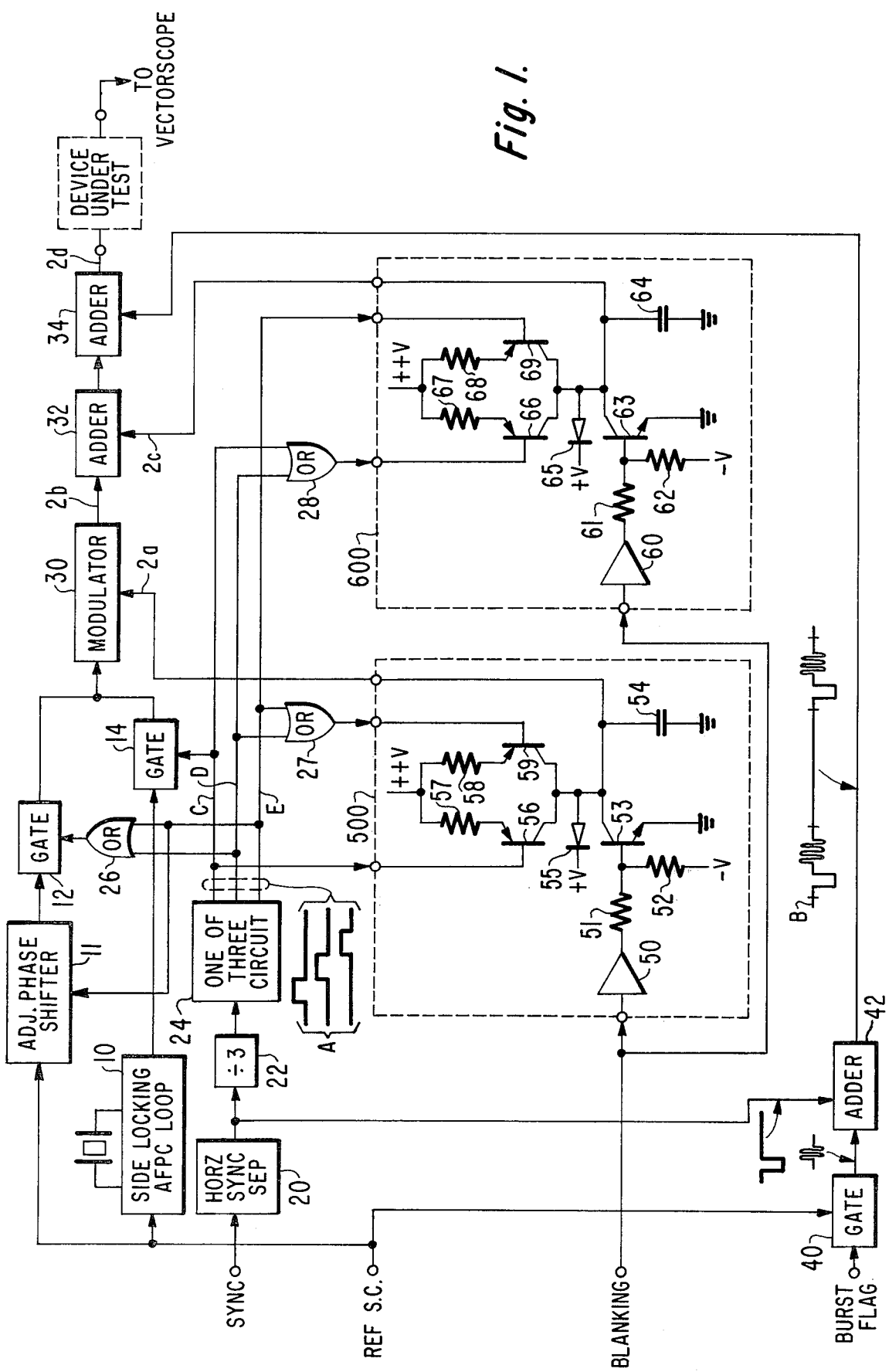
FIG. 1 is a block diagram, partially in schematic form, of a system embodying the present invention.

In FIG. 1, a reference subcarrier (REF. S.C.) is coupled to the input terminal of gate circuit 12 through an adjustable phase shift circuit 11, the control terminal of a side-locking AFPC loop 10 and one input terminal of a burst gate circuit 40. AFPC circuit 10 operates at a nominal frequency determined by a crystal which resonates at the color subcarrier of 3.58 MHz plus 15,734 Hz. In an alternate embodiment, the crystal may be chosen to resonate at the subcarrier frequency of 3.58 MHz minus 15,734 Hz. The signal at the output terminal of AFPC circuit 10 is in the form of a subcarrier 15,734 Hz high in frequency, which goes through a 360° phase shift relative to the input subcarrier during one television line. The output signal of AFPC circuit 10 is coupled to the input terminal of a gate 14. The output signals from gates 12 and 14 are selectively applied to the input terminal of a modulator 30 in response to gating signals applied to gates 12 and 14. Gating signals for activating gates 12 and 14, as well as other functions yet to be described, are generated in response to synchronizing signals (sync) coupled to horizontal sync separator 20. The output signal from sync separator 20, in the form of the horizontal component of sync, is coupled to an adder 42 wherein it is combined with the output of gate 40 in response to an external burst flag signal to provide a synchronizing waveform B, which is, in turn, coupled to one input terminal of adder 34 for providing the horizontal synchronizing and burst components of the test signal being generated by the apparatus of FIG. 1. The output from horizontal sync separator 20 is also coupled to an input terminal of a divide-by-three circuit 22. The output signal from divider circuit 22 is coupled to the input terminal of a one-of-three circuit 24, which may be described as an electronic distributor. The output signal from circuit 24 (waveform A) is cyclic in nature so as to make each one of the three output lines from circuit 24 high in succession in a repetitive or cyclic sequence, C, D, E. Output line C is coupled to an enabling terminal of gate 14, while output lines D and E are coupled by an OR gate 26 to the enabling terminal of gate 12. In operation, line C goes high, which enables gate 14, so as to couple the varying phase subcarrier output of AFPC loop 10 to the input terminal of modulator 30 for one television line. In similar fashion, line D enables gate 12 so as to couple the reference subcarrier of constant phase to the input of modulator 30 for the next or second television line, while line E, which enables gate 12, also provides a control signal to adjustable phase shifter 11 so as to couple the reference subcarrier of a different but also constant phase to the input of modulator 30 for the next or third television line.

The subcarrier output signals from gates 12 and 14 are modulated in modulator 30 by means of a signal (waveform sequence — FIG. 2a) provided by a waveform generator 500 in the following manner. An external system blanking signal is coupled to the base electrode of transistor 53 by means of amplifier 50 and resistor 51. Resistor 52, coupled to a source of voltage −V, provides a bias reference for the base electrode of transistor 53. The collector of transistor 53 is coupled to a capacitor 54 and, in turn, to the output terminal of waveform generator 500. In operation, transistor 53 is clamped to a point of reference (ground) during the blanking interval (e.g., $t_1 - t_2$ of waveform 2a), which establishes substantially zero volts at the output terminal of waveform generator 500. At the end of the blanking period, which corresponds to the beginning of a television line, transistor 53 is turned off and capacitor 54 is allowed to charge by means of a current path comprising either transistor 56 and resistor 57 or transistor 59 and resistor 58 from a voltage source $==V$. The charging path is chosen for a particular line by the previously described cyclic gating signal C, D, E. In operation, gating signal C, coupled to the base of transistor 56, turns transistor 56 on completing the current path from voltage source $++V$ through capacitor 54 to ground, which, by virtue of resistor 57 being very small, charges capacitor 54 very rapidly to a level $+V$ established by diode 55 (period $t_2 - t_3$ of the waveform of FIG. 2a). In a similar fashion, gating signals D and E, coupled to the base of transistor 59 by means of OR gate 27, turn transistor 59 on, which enables the current path containing resistor 58. Resistor 58 is made large so that the charging of capacitor 54 produces a gradual voltage slope at the output terminal of waveform generator 500 (period $t_4 - t_5$ and $t_6 - t_7$ of the waveform of FIG. 2a). The output signal developed from modulator 30 in response to the selected subcarrier signal inputs from gates 12 and 14 being modulating by waveform 2a from generator 500 (represented by the cyclic waveform of FIG. 2b) is coupled to one input terminal of an adder 32. The other input terminal of adder 32 receives a signal from waveform generator 600 which operates in a manner similar to waveform generator 500 to develop a pedestal waveform illustrated by the waveform of FIG. 2c. The output signal of adder 32 is coupled to a further adder 34 wherein the signal output of adder 32 is combined with the synchronizing components developed as previously described in adder 42. The output signal from adder 34 is the desired 3 television line cyclic signal illustrated by the waveform of FIG. 2d, wherein the periods $t_1 - t_2, t_3 - t_4, t_5 - t_6$ represent system synchronizing components; the period $t_2 - t_3$ corresponds to an active line portion having constant chrominance amplitude with changing phase of 0° - 360°; the period $t_4 - t_5$ corresponds to an active line portion having a changing chrominance amplitude with a constant phase; and the period $t_6 - t_7$ corresponds to an active line portion having a changing chrominance amplitude of constant phase and increasing luminance.

The measurement of saturation, hue and luminance crosstalk utilizing the above-described cyclic test signal is conveniently performed by using a commercially available display device commonly known as a vectorscope, an example of which is the Model 520 Vectorscope manufactured by Tektronix, Inc. of Beaverton, Oregon, U.S.A. A vectorscope of the type described generally contains horizontal (H) and vertical (V) amplifiers with identical signal translating characteristics and color demodulators for the I and Q signal components. The vectorscope in use with the invention and a device under test which contributed no error, crosstalk or distortion to its applied input signal (waveform 2d) would present a display, as illustrated in FIG. 3a. In FIG. 3a, trace 1 represents the hue of the applied signal by means of the operation of the I and Q demodulators of the vectorscope demodulating the phase of the applied signal relative to a fixed subcarrier reference, which is also coupled to the vectorscope. Since the I and Q demodulators are phased 90° apart and the H and V deflection amplifiers are identical, a constant amplitude signal of constantly varying phase, as illustrated by the period $t_2 - t_3$ of FIG. 2d, results in a circular trace beginning at one edge of the blanking signal and rotating counterclockwise to the leading edge of the next blanking signal. The trace 1 therefore represents varying phase or hue of the applied subcarrier from approximately magenta through red, green and blue. The repetition rate of the applied signal at television line rate coupled with the persistance of the phosphor of the vectorscope display tube gives the trace the appearance of a constant image.

Trace 2 represents the saturation of the color signal at a particular hue represented by the constant phase of the subcarrier. If there is no color signal, there will be no input signal to the I and Q demodulators resulting in a zero output from the demodulators which would result in the absence of trace 2. Such a signal condition and resultant lack of trace 2 also corresponds to a monochrome line signal. As the signal amplitude at a constant phase increases, as illustrated by the period $t_4 - t_5$ of FIG. 2, the trace 2 is generated from the center of the display (no color) to the outer limits of trace 1 corresponding to full saturation at the particular hue represented by the constant phase of the applied signal. As in trace 1, signal rate and display persistance yields a constant image represented by trace 2.

Although a vectorscope of the type described does not represent luminance directly, it is possible by utilizing a test signal generated in accordance with the invention to develop on the display a presentation illustrated by a third trace corresponding to period $t_6 - t_7$ of FIG. 2d in which a luminance component, which changes with saturation at a known rate, will indicate the effect of luminance on chrominance. Trace 3 of FIG. 3a illustrates such a signal display.

Trace 3 is generated in a similar fashion, as is trace 2. However, since the subcarrier applied to gate 12 for generating the signal during period $t_4 - t_5$ is of constant phase, it is necessary to make a provision for adjusting the constant phase of the signal period $t_6 - t_7$ to a different phase if trace 3 is not to appear superimposed on trace 2. This is accomplished in the apparatus of FIG. 1 by an adjustable phase shifter 11 which is enabled during the cyclic period $t_6 - t_7$ by a control signal corresponding to cyclic gating signal E coupled thereto.

FIG. 3b illustrates a display presentation when the device under test does contribute errors in the form of crosstalk and distortion to the applied signal. The crosstalk, for example, is measurable by observation of the three traces on the vectorscope display where hue crosstalk into saturation is measurable by the distortion of trace 1 corresponding to the signal period $t_2 - t_3$; saturation into hue is measurable by distortion of trace 2 corresponding to signal period $t_4 - t_5$; and saturation and luminance into hue is measurable by distortion of trace 3 corresponding to the signal period $t_6 - t_7$.

The use of the invention, as described above, provides a convenient and rapid means for evaluating the design and operation of television signal apparatus; additionally, the invention provides an effective means for the maintenance and service adjustment of such television equipment in normal studio operation.

What is claimed is:

1. A method of testing color television systems in conjunction with a vectorscope display device for measuring saturation, hue and luminance crosstalk, comprising:

generating a repetitive cyclic test signal corresponding to first, second and third television lines having synchronizing and active line portions for developing first, second and third information traces on said display device;

said first television line active line portion having a constant chrominance amplitude with changing phase for representing variations in hue on said first information trace;

said second television line active line portion having a changing chrominance amplitude with constant phase for representing variations in saturation on said second information trace;

said third television line active line portion having a changing chrominance amplitude with constant phase and increasing luminance amplitude for representing variations in saturation with luminance on said third information trace;

applying said repetitive test signal to television equipment under test; and measuring crosstalk in the form of hue into saturation, saturation into hue, saturation and luminance into hue as a function of the distortion of said first, second and third information traces.

2. Test apparatus for use in conjuction with a vectorscope display device for measuring saturation, hue and luminance crosstalk in color television systems, comprising:

means for generating test signals within the active line portion of first, second and third television lines;

said first television line active line portion signal having a constant chrominance amplitude with changing phase;

said second television line active line portion signal having a changing chrominance amplitude with constant phase;

said third television line active line portion signal having a changing chrominance amplitude with constant phase and increasing luminance amplitude;

gating means coupled to said generating means for repeating said first, second and third active line portions in a repetitive sequence;

means for generating line synchronizing signal components;

means coupled to said active line portion signal generating means and to said line synchronizing signal generating means for providing a repetitive cyclic test signal having synchronizing and active line portions, wherein said active line portions correspond to said first, second and third active line portions; and means for applying said repetitive test signal to said television system under test for developing first, second and third information traces on said display device for measuring saturation, hue and luminance crosstalk as a function of the distortion of said first, second and third information traces.

* * * * *